(12) United States Patent
Ramaswamy

(10) Patent No.: US 6,338,085 B1
(45) Date of Patent: Jan. 8, 2002

(54) TELEPHONE ACTIVATED WEB SERVER

(75) Inventor: Muralidharan Ramaswamy, Danbury, CT (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/107,183

(22) Filed: Jun. 29, 1998

(51) Int. Cl.[7] ............................................... G06F 15/16
(52) U.S. Cl. ....................................... 709/217; 709/203
(58) Field of Search ............................... 709/203, 217; 379/90.01, 93.25

(56) References Cited

U.S. PATENT DOCUMENTS

| | | | | |
|---|---|---|---|---|
| 5,812,776 A | * | 9/1998 | Gifford ........................ | 709/217 |
| 5,838,682 A | * | 11/1998 | Dekelbaum et al. ......... | 370/351 |
| 5,850,433 A | * | 12/1998 | Rondeau ...................... | 379/201 |
| 5,884,262 A | * | 3/1999 | Wise et al. ................... | 704/270 |
| 5,915,001 A | * | 6/1999 | Uppalmru ................. | 379/88.22 |
| 5,937,041 A | * | 8/1999 | Cardille, IV et al. ..... | 379/93.25 |
| 5,945,989 A | * | 8/1999 | Freishtat et al. ............ | 345/329 |
| 6,144,667 A | * | 11/2000 | Doshi et al. ................ | 370/401 |

FOREIGN PATENT DOCUMENTS

| | | | | |
|---|---|---|---|---|
| DE | 19819771 | 11/1999 | ........... | H04L/29/00 |
| WO | WO9854724 | 12/1998 | ........... | H04L/12/28 |

\* cited by examiner

*Primary Examiner*—Mehmet B. Geckil
(74) *Attorney, Agent, or Firm*—Gregory L. Thorne

(57) ABSTRACT

In general, the invention provides for on-demand access to web pages that are stored remote from, and independent of, a web page service provider. In a preferred embodiment, the web page service provider provides an index that contains a reference to more detailed web pages. The more detailed web pages are stored local to the party supplying the web pages, for example, on a computer located at a client's site. When a user of the web page service initiates a request for a more detailed web page, the web page service telephones the computer at the client's site, uploads the requested web page, and provides it to the user. The index can be based on geographic information, thereby providing for web page access based on the locale of the client and the user.

16 Claims, 4 Drawing Sheets

TELEPHONE ACTIVATED WEB SERVER

FIELD OF THE INVENTION

This invention relates generally to the field of computers and communication, and in particular to access to information via the World Wide Web.

BACKGROUND OF THE INVENTION

The World Wide Web has provided users with unprecedented access to information. In particular, the World Wide Web has provided users with an ability to perform targeted searches for specific information. In the commercial field, this has provided vendors an opportunity to provide potential buyers with information specific to their requests. For example, a user can browse the World Wide Web for restaurants, and the restaurateurs can provide details regarding their menu, service, atmosphere, and other material intended to attract the user to their particular establishment. In today's environment, it is rare to find a commercial concern that is unaffected by their potential customers use of the World Wide Web.

For ease of reading, the paradigm of a client desiring to offer access to client specific information will be utilized herein. The form of the client specific information in this paradigm is a web page, and the intended recipient of this information is termed the user. The term web is used in this paradigm to refer to the World Wide Web, although other examples of client specific information and computer networks could be envisioned as well.

To provide the access to the web pages describing the client's services and products, the client places the web pages on a web server that is accessible via the web. Large commercial concerns maintain computer systems dedicated to providing potential users with web access to their information. Smaller commercial concerns contract with a web service provider to store their web pages on the provider's web server. At an intermediate level, a client can provide a computer system that is accessible by a commercial web service provider, but the cost of maintaining a continuous communication link with the commercial web service provider can make this option cost prohibitive. As the popularity and use of the web increases, the demand, and correspondingly the cost, for web page service can be expected to increase as well.

The commercial payback to the client from the use of a web page service is difficult to assess. This difficulty is compounded by the fact that the web is world-wide. A client who offers products that can be easily shipped world-wide may be very well served by a web page on the World Wide Web, but a client offering a local service would not have the same potential return on investment. A client of a product for which a buyer would expect to have local service or support, such as an automobile, may not attract a world-wide audience, but would likely be competitively disadvantaged without advertising information on the web.

The marginal worth of providing additional information via the web, relative to the additional cost to provide this additional information, is also difficult to assess. Web pages are often structured in a hierarchical manner, allowing casual users to scan the possibilities, and allowing interested users to delve into the specifics of a particular client's offerings. The marginal worth of providing detailed information is dependent upon the likelihood that the user who delves into the detail is an actual buyer, compared to the likelihood that an actual buyer will go elsewhere if not provided this detail. Although most web service providers can provide a client with a count of the number of users that have accessed a particular web page, this feedback is not necessarily a reliable indication of the need for the particular web page, and is not available until after the client has invested the time and cost to provide the page on the web server. Also, although additional detail can be added incrementally, as feedback from users and buyers is obtained, there are costs associated with obtaining this feedback, as well as costs and potential difficulties associated with incrementally adding web pages. As the demand for web page service increases, the cost and complexity of adding additional pages to an existing set of web pages on a commercial web server may become excessive.

Therefore, a need exists for a method and apparatus that allows for access to web pages with minimal dependence upon a web page service provider. A need also exists for a method and apparatus that allows for web page access on an on-demand basis. A need also exists for a method and apparatus for providing web page access based upon the geographic location of the user.

DETAILED DESCRIPTION OF THE PREFERRED EMBODIMENT

In general, the invention provides for on-demand access to web pages that are stored remote from, and independent of, a web page service provider. In a preferred embodiment, the web page service provider provides an index that contains a reference to more detailed web pages. The more detailed web pages are stored local to the client supplying the web pages, for example, on a computer located at a client's site. When a user of the web page service initiates a request for a more detailed web page, the web page service telephones the computer at the client's site, uploads the requested web page, and provides it to the user. The index can be based on geographic information, thereby providing for web page access based on the locale of the client and the user.

Figure 1:
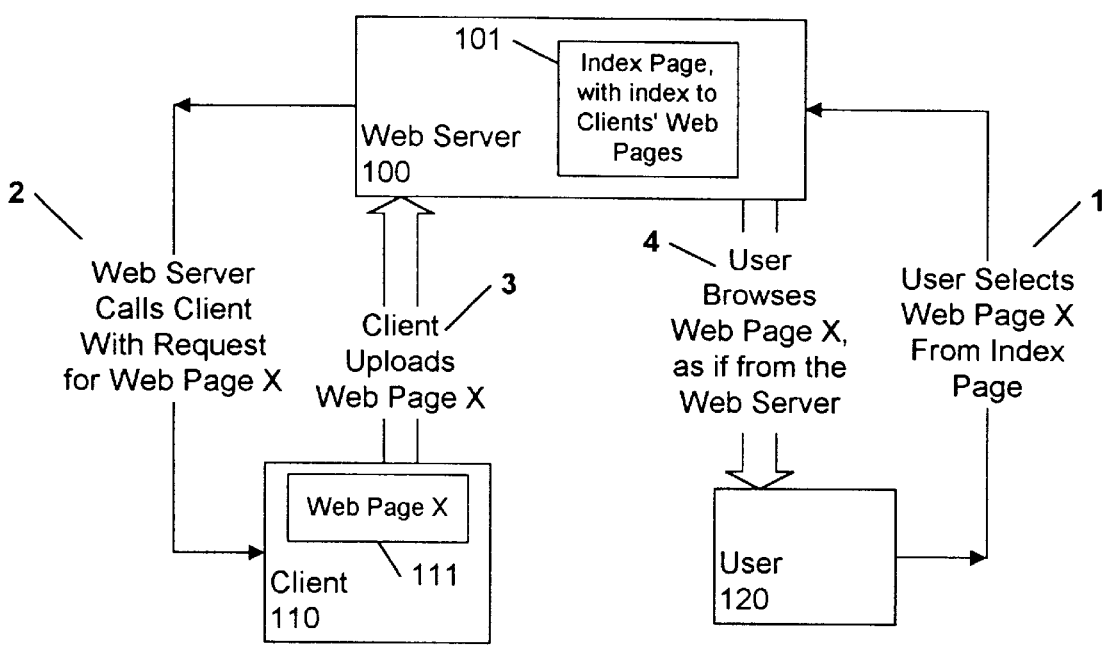
FIG. 1 illustrates a flow diagram for remote web page access in accordance with this invention.

FIG. 1 illustrates an example flow diagram for providing remote web page access to a user 120 of a web server 100. At 1, the user 120 selects a remote web page, web page X, from an index page 101 that is provided to the user 120 by the web server 100. At 2, based on information stored at the web server 100 regarding web page X, the web server 100 telephones the client 110 associated with web page X. At 3, the client 110 uploads web page X 111 to the web server 100. At 4, the web server 100 provides the user 120 access to the uploaded web page X. The web server 100 provides substantially the same access as that provided to web pages that are stored local to the web server 100, or stored at other WORLD WIDE WEB sites. Thus, the user 120 may browse the provided web page X as if it were a conventional web-stored web page. The web page X may contain, or include references to, pictures, graphic images, video clips, audio announcements, and other multimedia information that is intended to increase the user's interest in the client's product or services. It may also include advertisements and references to other web pages to potentially offset the cost of this on-demand web page access.

As illustrated by the example of FIG. 1, the web server 100 need only contain information relative to the location of web page X, rather than containing the web page itself. Web page X may also contain references to other web pages stored at the client site 110, or stored at the web server 100. A request to access another web page stored at the client site 110 will be processed in the same manner as shown in FIG. 1, except that the user request is from web page X, rather than the index page 101. Assuming, for example, that there is a cost associated with storage of information at the web server, and a cost associated with the "call on demand" service shown in FIG. 1, the web service provider and client can negotiate the amount of information that is stored at the web server and the amount of information that is stored at the client location. Depending upon the number of requests for access to information stored at each location, the client can subsequently choose to place more or less information at the web server 100. Thus, the client need not incur the cost of storing all the information regarding the client's products or services at the web server 100 until it is determined that this information is being requested by a sufficient number of users to justify the cost of such web server storage.

Figure 2:
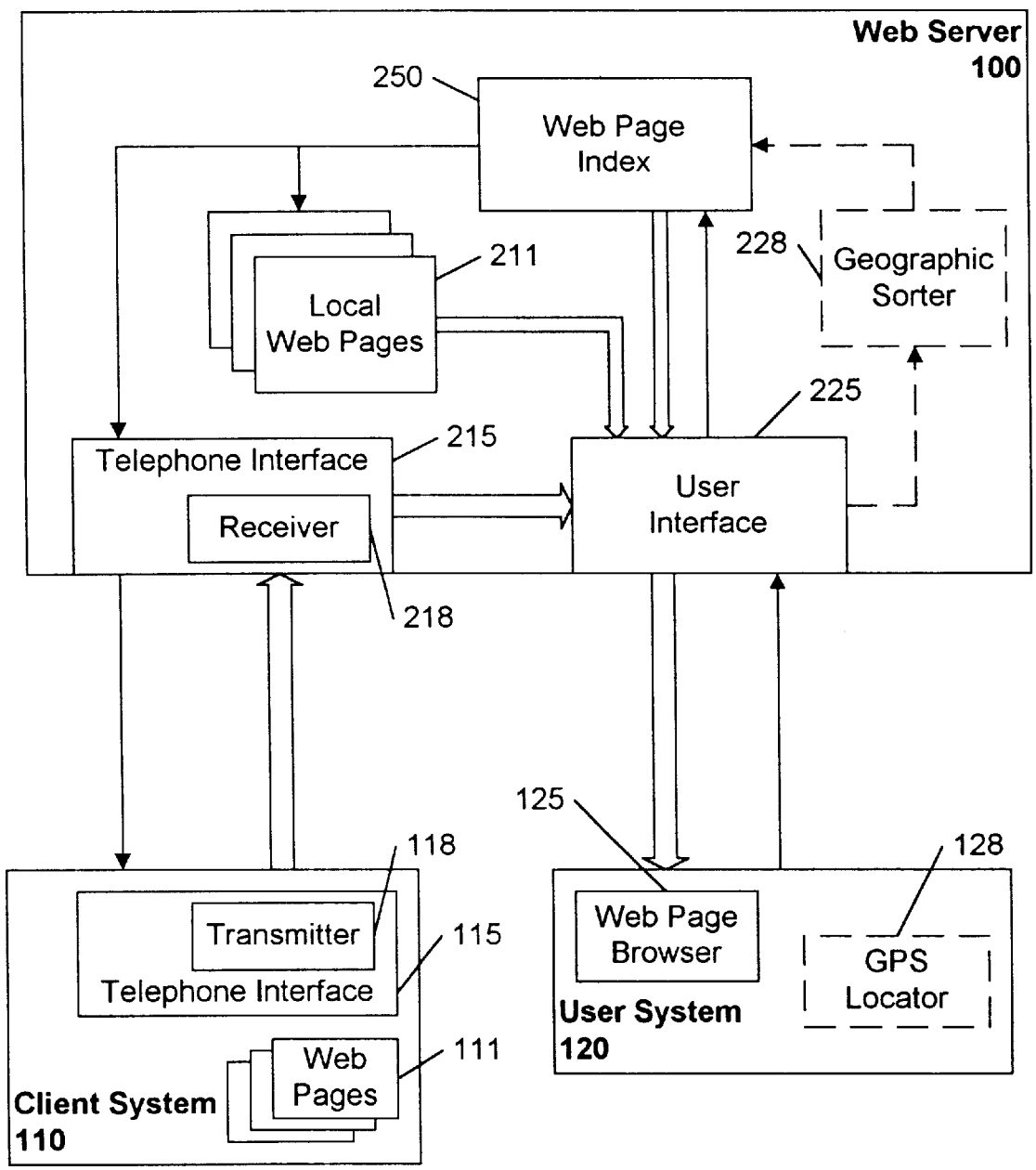
FIG. 2 illustrates a block diagram for providing a user with access to web pages stored at a remote client system via a web server in accordance with this invention.

FIG. 2 illustrates an example block diagram of a web server 100, client system 110, and user system 120 for providing a user with access to web pages stored at the client system 110 via the web server 100. The web server 100 includes a user interface 225 for communicating with and receiving commands from the user of user system 120. The user system 120 includes a web page browser 125 for effecting this communication with the web server 100. The web server 100 includes a web page index 250 that allows the user to select among a variety of web pages. If the user selects a web page 211 that is local to the web server 100, the user interface 225 provides the selected web page 211 to the user for continued browsing. If the user selects a web page that is not local to the web server 100, as indicated by a remote reference in the web page index 250, the telephone interface 215 initiates a telephone call to communicate with the client system 110 that contains the selected web page. In response to the telephone call from the web server 100, the client system 110 communicates the selected web page 111 via a transmitter 118. The transmitted web page 111 is received by the web server 100 via a receiver 218. The user interface 225 provides the received web page 111 to the user system 120 for continued browsing. In this manner, the remote web page 111 is provided to the user system 120 in the same manner as the local web page 211.

The mode and protocol for communications between the user system 120 and the client system 110 can take a variety of forms. As presented thus far, the web server 100 acts as an isolating buffer, such that there is no direct communication between the user system 120 and the client system 110. Alternatively, once the telephone communication link is established between the web server 100 and the client system 110, the web server 100 may act as a transparent buffer, such that, for example, user requests for subsequent web pages at the client system are effected by the client system 110. As another alternative, the user system 120 may include an auxiliary telephone interface and receiver, similar to that of block 215 in the web server 100. In response to a user request for a remote web page 111 in such a system, the web server 100 provides the client telephone number to the auxiliary telephone interface of the user system 120, and the user system 120 places the telephone call and requests an upload of the selected web page 111 directly to the client system 110. Other schemes for establishing the telephone connection to the client system 110 and modes of interaction between the user system 120 and the client system 110 can be employed, as would be evident to one of ordinary skill in the art.

Also shown in FIG. 2 is an optional geographic sorter 228 at the web server 100 that is used to customize the web page index that is provided to the user system 120, in dependence upon the geographic location of the user system 120 and the client system 110. For example, the user of the user system 120 may provide a postal zip code to the web server 100, and request that the information provided on the web page index be limited to information that is pertinent to a proximity to that postal zip code. Or, the limit can be more general, for example, based on the user's country or continent. The limit may also be dynamic, particularly if the user system 120 is mobile. As shown in FIG. 2, the user system 120 may contain an optional Global Positioning System (GPS) locator 128 that provides the location of the user system 120 as a pair of latitude-longitude coordinates. By providing the web server 100 with a current geographic position, the web page index 250 can be dynamically changed, and may include auxiliary information, such as the distance between the user system 120 and the client sites 110 that pertains to each of the indexed web pages.

Figure 3:
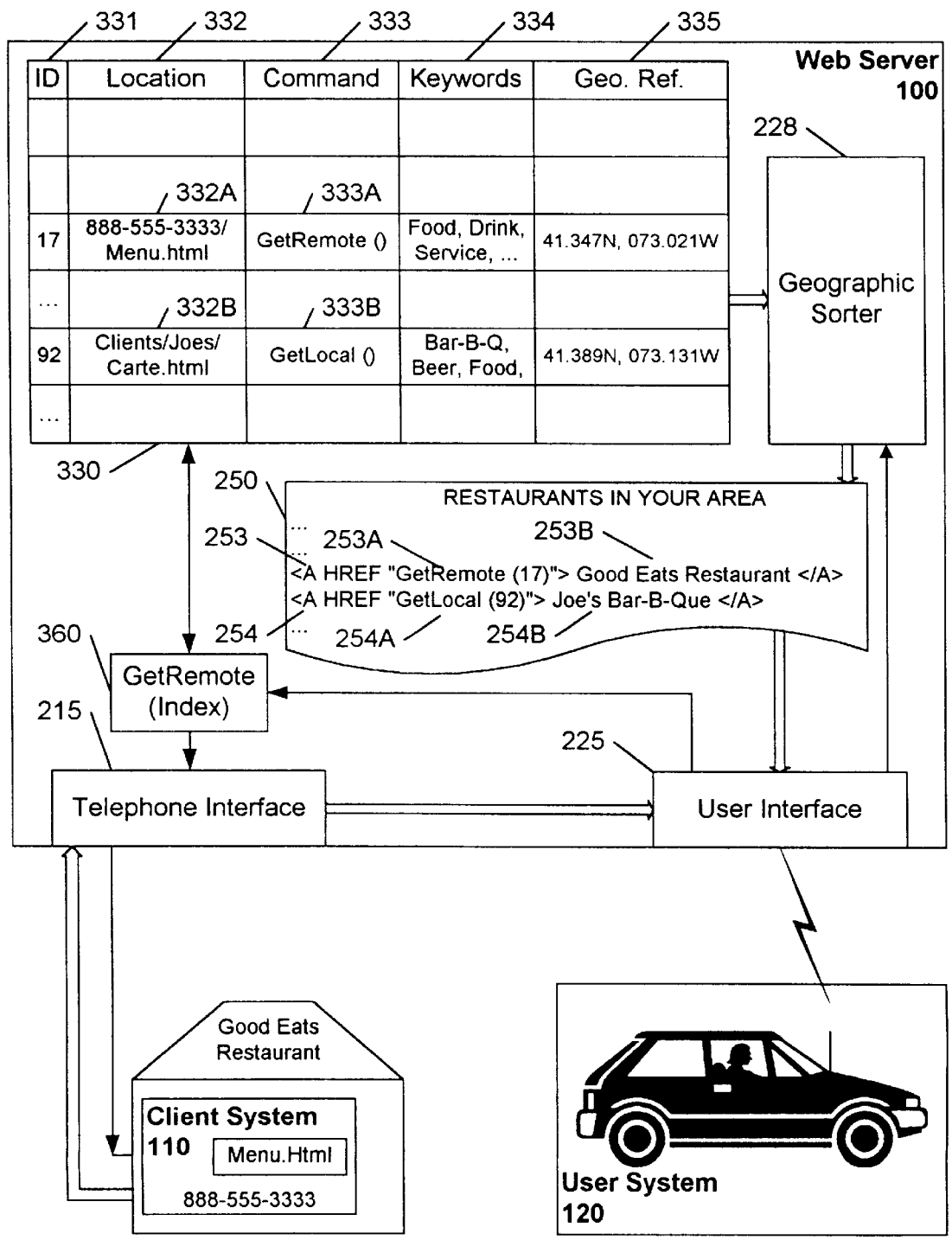
FIG. 3 illustrates a block diagram and flow diagram for an example application of accessing a remote web page in accordance with this invention.

FIG. 3 illustrates a block diagram and flow diagram of an example application of this invention. The user system 120 is illustrated as an automobile, containing for example a GPS receiver and a wireless communication means for communicating with the web server 100. The user of the user system 120 requests a list of all the restaurants within a particular radius of the user's location, or along the user's current route. The geographic sorter 228 searches a database 330 for entries corresponding to the user's request. The example database 330 contains a number of fields 331–335, one of which is the geographic reference 335 pertaining to each database entry. Other fields, not shown, contain for example, the text that is to be displayed in the index, and perhaps Universal Resource Locators (URLs) that reference images or other items to be displayed. The database 330 also includes keywords 334 that may be used to refine the search in response to the user's request. In this example, the user selects "food" as the keyword, and the geographic sorter 228 creates the example index web page 250 that includes the entries in the database 330 that contain the keyword "food" and are within the geographic range of the user's location. Two example database entries are shown, identified by ID 331 references of 17 and 92 respectively, that satisfy this example criteria. These database entries 17 and 92 are provided to the user in the form of a hypertext web page 250.

The hypertext entries 253 and 254 are illustrated in HyperText Markup Language (HTML) format, common to one of ordinary skill in the art. The caption "Good Eats Restaurant" 253B is displayed by the user's browser 125 as a hypertext highlighted field. When the user selects this highlighted field 253B, the associated hypertext reference "GetRemote (17)" 253A will be executed at the web server 100. In this example, the function GetRemote 360 accesses the database 330 to determine the location 332 of the reference identifier 17. The location 332A corresponding to the reference identifier 17 is shown as a telephone number "888-555-3333" followed by a file name "menu.html". The GetRemote function 360 dials the telephone number and requests an upload of the file named "menu.html". The client system 110 having this telephone number responds to this request by uploading the "menu.html" web page. This menu.html web page is presented to the user via the user interface 225. In this manner, the user of user system 120 can browse the menu of the Good Eats Restaurant to determine whether to eat there or elsewhere. Note that the client's menu web page is not stored on the web server 100, and is only accessed on demand by a user. If the cost of this service is a function of the number of accesses that the web server 100 makes to the client system 110, the client pays for actual accesses, rather than for potential accesses, thus making the service particularly cost effective when the number of actual accesses is low. Also note that by coupling the web page data base 330 to the web page index 250 via a geographic sorter 228, the number of actual accesses will be constrained to those user's who are within a geographic proximity to the client's locale.

As shown in FIGS. 2–3, this method of remote access to a web page is compatible with existing methods of local access to web pages. The database entry 92 illustrates, at 332B, a locally stored web page "carte.html", stored at a "clients/joes" file directory, which is accessed via the referenced function "GetLocal" 333B. The GetLocal function (not explicitly shown) provides the referenced web page 332B to the user interface 225 for browsing by the user. As would be evident to one of ordinary skill in the art, a common function could be used in lieu of the individual GetRemote 333A and GetLocal 333B functions, wherein the common function determines whether to effect a remote or local access in dependence upon the locator field 332A, 332B.

Figure 4:
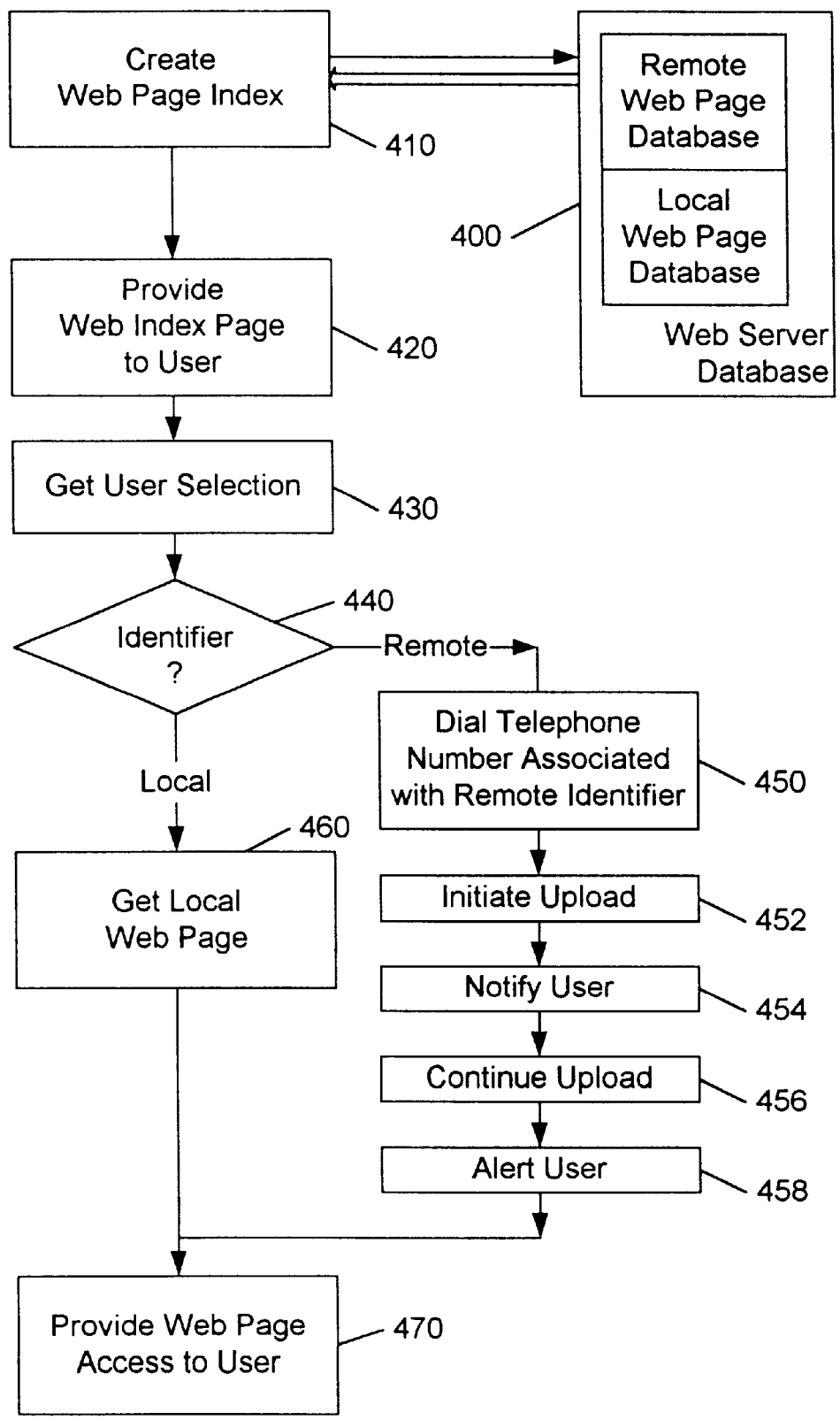
FIG. 4 illustrates an example flowchart in accordance with this invention.

FIG. 4 illustrates an example flowchart in accordance with this invention. At 410, a web page index is created. This web page index may be static or dynamic. A static index is created once, and stored at the web server for access to users as requested. A dynamic index is created on demand and stored temporarily. The dynamic index will contain different entries dependent upon the conditions provided at the time the index is created, for example based on keywords or locations. The web page index is based upon entries in a database 400 at the web server, which may include both remote and local web page entries. The web page index page is provided to the user, at 420, and the user's selection is received, at 430. Each web page is identified as being local or remote; this identifier is checked at 440. If the web page is identified as being local, the local web page is obtained 460 and provided to the user for browsing, at 470. If the web page is identified as being remote, the remote site is telephoned, at 450, and an upload is initiated, at 452. In accordance with one aspect of this invention, because a remote upload may take significantly more time than a local access, the user is notified of a potential delay, at 454, and is provided an option to do other tasks while the upload continues, at 456. When the upload is completed, the user is alerted, at 458. The requested remote web page is provided to the user for browsing at 470, just as the local web page, discussed above.

The foregoing merely illustrates the principles of the invention. It will thus be appreciated that those skilled in the art will be able to devise various arrangements which, although not explicitly described or shown herein, embody the principles of the invention and are thus within its spirit and scope. For example, any number of techniques for uploading and downloading the requested web page can be employed, such as client-push, web-server-pull, user-pull, web-server-push, etc. Similarly, other indexing criteria, in addition to keywords and locale may be employed, using database search techniques common to one of ordinary skill in the art. Similarly, the partitioning of functions as presented herein is not absolute. For example, the index page 250, the database 330, and the geographic sorter may be contained in one indexing function, or the telephone number portion of the database 330 may be contained in the telephone interface 215.

I claim:

1. A method for providing access to a web page that is located at a client system, comprising:
   storing a telephone number associated with an identifier of the web page on a web server;
   dialing the telephone number when a user selects the identifier to the web page on the web server; and
   initiating a transmission of the web page from the client system to the web server, in response to the dialing of the telephone number, so as to facilitate the access to the web page by the user.

2. The method of claim 1, wherein the web page includes at least one of the following: text data, graphics data, audio data, and video data.

3. The method of claim 1, wherein the identifier is one of a plurality of identifiers that are stored in an index.

4. The method of claim 1, wherein the identifier is a hypertext reference to a program that dials the telephone number, and the user selects the identifier by selecting a hypertext region of a hypertext page that is associated with the hypertext reference.

5. The method of claim 4, wherein the identifier is one of a plurality of identifiers that are each selectable from the hypertext page.

6. The method of claim 1, further including the steps of:
   notifying the user of a delay in accessing the web page; and,
   alerting the user when the transmission of the web page occurs.

7. A web server comprising:
   an index page that includes at least one identifier to a remote web page, and at least one telephone number that is associated with the at least one identifier;
   a user interface that provides the index page to a user and allows the user to select the at least one identifier;
   a telephone interface, operably coupled to the user interface, that establishes a communications link with a remote computer based on the telephone number associated with the selected at least one identifier, and communicates a request that initiates a transmission of the remote web page via the communications link; and
   a receiver, operably coupled to the telephone interface, that receives the remote web page via the communications link, thereby facilitating an access to the remote web page by the user.

8. The web server of claim 7, further including a geographic sorter that provides the at least one identifier to the index page based on a geographic reference.

9. The web server of claim 8, wherein the geographic reference is provided by the user.

10. The web server of claim 7, wherein the index page also includes at least one other identifier to a local web page that is stored in a memory at the web server.

11. The web server of claim 7, wherein the user interface also provides a notification to the user of a delay for accessing the remote web page and thereafter provides an alert to the user when the remote web page is received by the receiver.

12. The web server of claim 7, wherein the user interface also provides a notification to the user of a delay in dependence upon whether the at least one identifier to the remote web page is selected, and thereafter provides an alert to the user when the remote web page is received by the receiver.

13. A communication system comprising:
- a web server that provides web page access to a user, that includes:
  - a web page index that indicates a telephone number associated with a client web page,
  - a telephone interface, operably coupled to the web page index, that calls the telephone number and requests the client web page, and,
  - a receiver that receives the client web page, thereby facilitating the user access to the client web page; and,
- a client system that includes:
  - the client web page,
  - a telephone interface that receives telephone calls made to the telephone number, and transmits the client web page in response to the telephone calls.

14. The communication system of claim 13, wherein the web server also includes a geographic sorter that facilitates creation of the web page index based upon a geographic reference.

15. The communication system of claim 13, wherein the web page index is a hypertext page, and the user selects the client web page by selecting hypertext highlighted text, and the telephone number is associated with a hypertext reference that is associated with the selected hypertext highlighted text.

16. The communication system of claim 13, wherein the client web page includes at least one of text data, video data, audio data, and graphics data.

* * * * *